(12) United States Patent  (10) Patent No.: US 9,311,100 B2
Gupta et al.  (45) Date of Patent: Apr. 12, 2016

(54) USEFULNESS INDICATION FOR INDIRECT BRANCH PREDICTION TRAINING

(71) Applicant: Apple Inc., Cupertino, CA (US)

(72) Inventors: Sandeep Gupta, Santa Clara, CA (US); Shyam Sundar, Sunnyvale, CA (US); Wei-Han Lien, San Jose, CA (US); Gerard R. Williams, III, Los Altos, CA (US); Conrado Blasco-Allue, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 674 days.

(21) Appl. No.: 13/735,694

(22) Filed: Jan. 7, 2013

(65) Prior Publication Data

US 2014/0195789 A1 Jul. 10, 2014

(51) Int. Cl.
 *G06F 9/00* (2006.01)
 *G06F 9/38* (2006.01)
 *G06F 9/30* (2006.01)

(52) U.S. Cl.
 CPC ............ *G06F 9/3844* (2013.01); *G06F 9/3806* (2013.01); *G06F 9/30072* (2013.01); *G06F 9/3848* (2013.01)

(58) Field of Classification Search
 CPC ..................... G06F 9/30072; G06F 9/3848
 See application file for complete search history.

(56) References Cited

U.S. PATENT DOCUMENTS

| 6,233,678 | B1 | 5/2001 | Bala |
| 7,428,627 | B2 | 9/2008 | Jourdan et al. |
| 7,856,548 | B1 * | 12/2010 | Nelson .................. G06F 9/3832 712/220 |
| 7,941,607 | B1 | 5/2011 | Thaik et al. |
| 2006/0248319 | A1 | 11/2006 | Kadambi |

OTHER PUBLICATIONS

Karel Driesen and Urs Holzle "Multi-stage Cascaded Prediction" Aug. 31-Sep. 3, 1999, pp. 1-14.

* cited by examiner

*Primary Examiner* — Zachary K Huson
(74) *Attorney, Agent, or Firm* — Meyertons, Hood, Kivlin, Kowert & Goetzel, P.C.

(57) ABSTRACT

A circuit for implementing a branch target buffer. The branch target buffer may include a memory that stores a plurality of entries. Each entry may include a tag value, a target value, and a prediction accuracy value. A received index value corresponding to an indirect branch instruction may be used to select one of entries of the plurality of entries, and a received tag value may then be compared to the tag value of the selected entries in the memory. An entry in the memory may be selected in response to a determination that the received tag does not match the tag value of compared entries. The selected entry may be allocated to the indirect instruction branch dependent upon the prediction accuracy values of the plurality of entries.

25 Claims, 7 Drawing Sheets

USEFULNESS INDICATION FOR INDIRECT BRANCH PREDICTION TRAINING

BACKGROUND

1. Technical Field

This invention is related to the field of integrated circuit implementation, and more particularly to the implementation branch target buffers within processors.

2. Description of the Related Art

To improve performance, processors may attempt to exploit instruction-level parallelism (ILP) by simultaneously executing independent instructions. For example, a processor may execute instructions or portions of instructions before it is know if the instructions actually need to be executed. This technique is commonly referred to as "speculative execution."

To employ speculative execution within a processor, it is necessary to predict or "guess" how conditional branches (if-then-else structures within a computer program) are going to evaluate. Once a "branch prediction" has been made for a given conditional branch, a processor may be able to fetch and execute the instructions along the predict path, thereby allowing the execution pipeline with the processor to remain full and not stall. In the case when the branch prediction proves to be inaccurate, however, a processor's pipeline may stall while the actual instructions are fetched from memory.

Branch prediction may take several forms. For example, direction prediction may predict if a branch is taken, while target prediction may predict the target address of branch that is taken. Specialized hardware, such as, e.g., branch target buffers, may be employed for making predictions. A branch target buffer may be designed in accordance with one of various designs styles, and may include, multiple prediction entries organized in a table. During the execution of a computer program, entries within a branch target buffer may be updated to improve prediction accuracy.

SUMMARY OF THE EMBODIMENTS

Various embodiments of a circuit implementing a branch target buffer are disclosed. Broadly speaking, a circuit and a method are contemplated in which entries are stored in a memory, and each entry includes a tag value, a target value and a prediction accuracy value. A control module may receive an index value and a tag value corresponding to an indirect instruction branch. The index value may be used to read one or more entries stored in the memory. In response to a determination that the tag value does not match the tag value of any of the read entries, the control module may select a stored entry dependent upon the prediction accuracy value of the selected stored entry. The control module may allocate the selected stored entry to the indirect branch instruction dependent upon the prediction accuracy values of the stored entries.

In one embodiment, the control module may determine that the prediction accuracy value of the selected stored entry is indicative of a correct prediction. The control module may then prevent the allocation of the selected stored entry in response to the determination.

In a further embodiment, the control module may determine that the received tag value matches the tag value of one of the read entries. The control module may then set the prediction accuracy value of the one of the read entries to a value indicative of a correct prediction.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor, which may integrate the function of a computing system onto a single integrated circuit. To improve performance, processors may rely on instruction level parallelism (ILP). Control hazards, however, may limit the extent to which a processor may exploit ILP. One method that may be employed to overcome the limits imposed by control hazards is prediction of conditional branches (if-then-else structures) within the instructions being executed by a processor.

Branch prediction may involve the prediction of a direction as well as a target. For branch prediction to be useful, predictions of the target a branch must be accurate. However, due to the large number of possible valid values of the target address, branch target prediction is difficult. Some processors employ branch target buffers (BTBs) to predict target addresses for branches. A BTB may include numerous entries of previously encountered branches and their respective target addresses, which may be used in determining the instructions to fetch. Some of the entries in a BTB may provide accurate predictions of the target addresses of branches, while the predicted target addresses in other entries may not provide accurate predictions. Improved accuracy of branch target predictions may be accomplished by removing entries that no longer provide accurate predictions. The embodiments illustrated in the drawings and described below may provide techniques for implementing branch target prediction with improved accuracy.

System-On-A-Chip Overview

Figure 1:
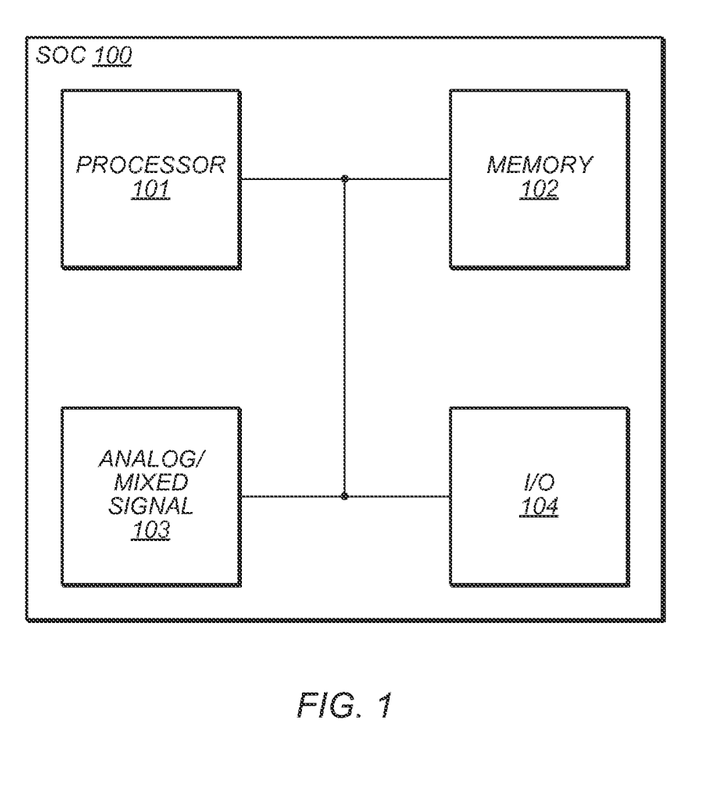
FIG. 1 illustrates an embodiment of a system on a chip.

A block diagram of an SoC is illustrated in FIG. 1. In the illustrated embodiment, the SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), or a FLASH memory, for example. It is noted that in the embodiment of an SoC illustrated in FIG. 1, a single memory block is depicted. In other embodiments, any suitable number of memory blocks may be employed.

As described in more detail below, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with cellular telephone networks.

I/O block 104 may be configured to coordinate data transfer between SoC 101 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between SoC 101 and one or more devices (e.g., other computer systems or SoCs) coupled to SoC 101 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

Processor Overview

Figure 2:
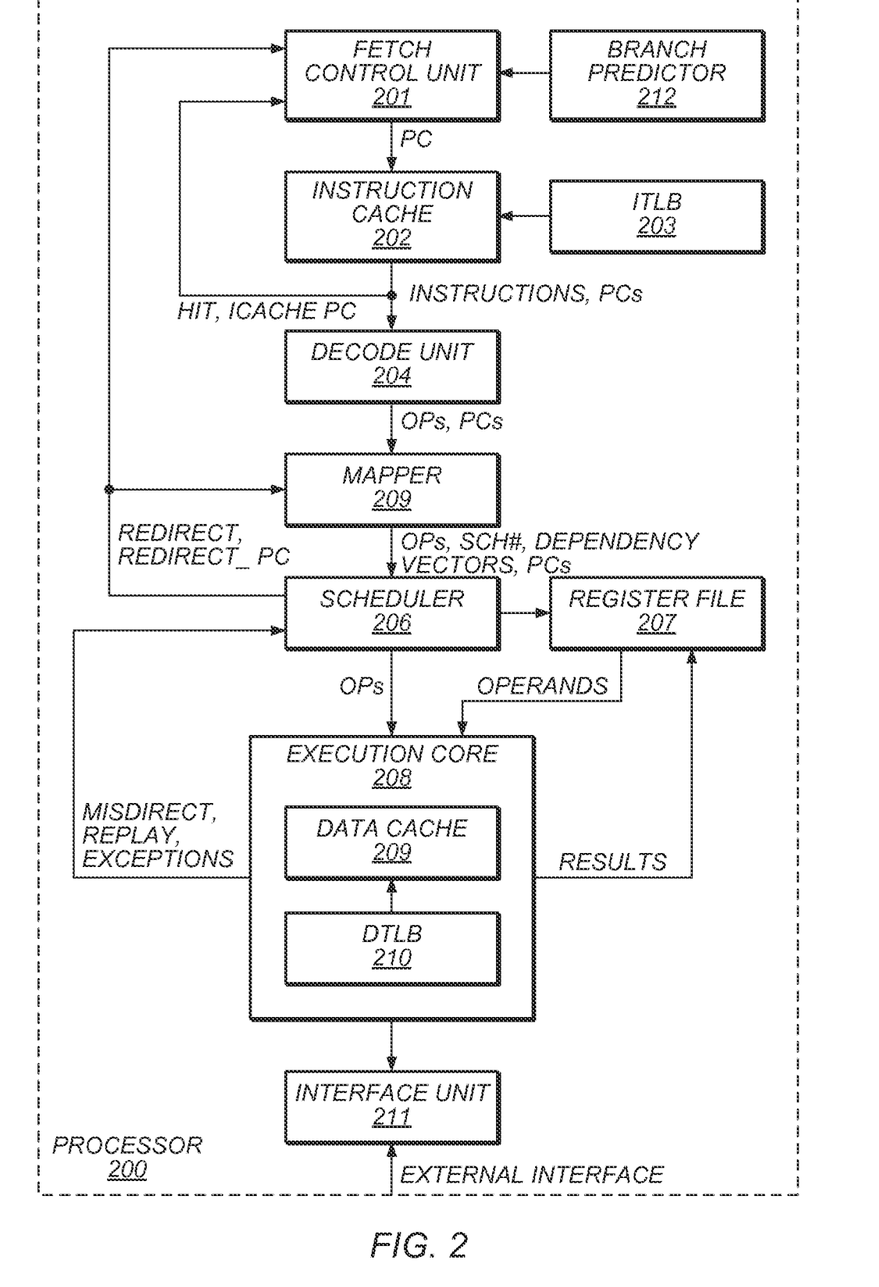
FIG. 2 illustrates an embodiment of a processor.

Turning now to FIG. 2, a block diagram of an embodiment of a processor 200 is shown. In the illustrated embodiment, the processor 200 includes a fetch control unit 201, an instruction cache 202, a decode unit 204, a mapper 209, a scheduler 206, a register file 207, an execution core 208, and an interface unit 211. The fetch control unit 201 is coupled to provide a program counter address (PC) for fetching from the instruction cache 202. The instruction cache 202 is coupled to provide instructions (with PCs) to the decode unit 204, which is coupled to provide decoded instruction operations (ops, again with PCs) to the mapper 205. The instruction cache 202 is further configured to provide a hit indication and an ICache PC to the fetch control unit 201. The mapper 205 is coupled to provide ops, a scheduler number (SCH#), source operand numbers (SO#s), one or more dependency vectors, and PCs to the scheduler 206. The scheduler 206 is coupled to receive replay, mispredict, and exception indications from the execution core 208, is coupled to provide a redirect indication and redirect PC to the fetch control unit 201 and the mapper 205, is coupled to the register file 207, and is coupled to provide ops for execution to the execution core 208. The register file is coupled to provide operands to the execution core 208, and is coupled to receive results to be written to the register file 207 from the execution core 208. The execution core 208 is coupled to the interface unit 211, which is further coupled to an external interface of the processor 200.

Fetch control unit 201 may be configured to generate fetch PCs for instruction cache 202. In some embodiments, fetch control unit 201 may include one or more types of branch predictors 212. For example, fetch control unit 202 may include indirect branch target predictors configured to predict the target address for indirect branch instructions, conditional branch predictors configured to predict the outcome of conditional branches, and/or any other suitable type of branch predictor. During operation, fetch control unit 201 may generate a fetch PC based on the output of a selected branch predictor. If the prediction later turns out to be incorrect, fetch control unit 201 may be redirected to fetch from a different address. When generating a fetch PC, in the absence of a nonsequential branch target (i.e., a branch or other redirection to a nonsequential address, whether speculative or non-speculative), fetch control unit 201 may generate a fetch PC as a sequential function of a current PC value. For example, depending on how many bytes are fetched from instruction cache 202 at a given time, fetch control unit 201 may generate a sequential fetch PC by adding a known offset to a current PC value.

The instruction cache 202 may be a cache memory for storing instructions to be executed by the processor 200. The instruction cache 202 may have any capacity and construction (e.g. direct mapped, set associative, fully associative, etc.). The instruction cache 202 may have any cache line size. For example, 64 byte cache lines may be implemented in an embodiment. Other embodiments may use larger or smaller cache line sizes. In response to a given PC from the fetch control unit 201, the instruction cache 202 may output up to a maximum number of instructions. It is contemplated that processor 200 may implement any suitable instruction set architecture (ISA), such as, e.g., the ARM™, PowerPC™, or x86 ISAs, or combinations thereof.

In some embodiments, processor 200 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 14 may be partially or completely addressed using physical address bits rather than virtual address bits. For example, instruction cache 202 may use virtual address bits for cache indexing and physical address bits for cache tags.

In order to avoid the cost of performing a full memory translation when performing a cache access, processor 200 may store a set of recent and/or frequently-used virtual-to-physical address translations in a translation lookaside buffer (TLB), such as Instruction TLB (ITLB) 203. During operation, ITLB 203 (which may be implemented as a cache, as a content addressable memory (CAM), or using any other suitable circuit structure) may receive virtual address information and determine whether a valid translation is present. If so, ITLB 203 may provide the corresponding physical address bits to instruction cache 202. If not, ITLB 203 may cause the translation to be determined, for example by raising a virtual memory exception.

The decode unit 204 may generally be configured to decode the instructions into instruction operations (ops). Generally, an instruction operation may be an operation that the hardware included in the execution core 208 is capable of executing. Each instruction may translate to one or more instruction operations which, when executed, result in the operation(s) defined for that instruction being performed according to the instruction set architecture implemented by the processor 200. In some embodiments, each instruction may decode into a single instruction operation. The decode unit 16 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 204 and mapper 205 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 204 may be provided to the mapper 205. The mapper 205 may implement register renaming to map source register addresses from the ops to the source operand numbers (SO#s) identifying the renamed source registers. Additionally, the mapper 205 may be configured to assign a scheduler entry to store each op, identified by the SCH#. In an embodiment, the SCH# may also be configured to identify the rename register assigned to the destination of the op. In other embodiments, the mapper 205 may be configured to assign a separate destination register number. Additionally, the mapper 205 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 205 may provide the ops, along with SCH#, SO#s, PCs, and dependency vectors for each op to the scheduler 206. The scheduler 206 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 206 may be configured to schedule the ops for execution in the execution core 208. When an op is scheduled, the scheduler 206 may be configured to read its source operands from the register file 207 and the source operands may be provided to the execution core 208. The execution core 208 may be configured to return the results of ops that update registers to the register file 207. In some cases, the execution core 208 may forward a result that is to be written to the register file 207 in place of the value read from the register file 207 (e.g. in the case of back to back scheduling of dependent ops).

The execution core 208 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 208 may be configured to execute predicted branch ops, and may receive the predicted target address that was originally provided to the fetch control unit 201. The execution core 208 may be configured to calculate the target address from the operands of the branch op, and to compare the calculated target address to the predicted target address to detect correct prediction or misprediction. The execution core 208 may also evaluate any other prediction made with respect to the branch op, such as a prediction of the branch op's direction. If a misprediction is detected, execution core 208 may signal that fetch control unit 201 should be redirected to the correct fetch target. Other units, such as the scheduler 206, the mapper 205, and the decode unit 204 may flush pending ops/instructions from the speculative instruction stream that are subsequent to or dependent upon the mispredicted branch.

The execution core may include a data cache 209, which may be a cache memory for storing data to be processed by the processor 200. Like the instruction cache 202, the data cache 209 may have any suitable capacity, construction, or line size (e.g. direct mapped, set associative, fully associative, etc.). Moreover, the data cache 209 may differ from the instruction cache 202 in any of these details. As with instruction cache 202, in some embodiments, data cache 26 may be partially or entirely addressed using physical address bits. Correspondingly, a data TLB (DTLB) 210 may be provided to cache virtual-to-physical address translations for use in accessing the data cache 209 in a manner similar to that described above with respect to ITLB 203. It is noted that although ITLB 203 and DTLB 210 may perform similar functions, in various embodiments they may be implemented differently. For example, they may store different numbers of translations and/or different translation information.

The register file 207 may generally include any set of registers usable to store operands and results of ops executed in the processor 200. In some embodiments, the register file 207 may include a set of physical registers and the mapper 205 may be configured to map the logical registers to the physical registers. The logical registers may include both architected registers specified by the instruction set architecture implemented by the processor 200 and temporary registers that may be used as destinations of ops for temporary results (and sources of subsequent ops as well). In other embodiments, the register file 207 may include an architected register set containing the committed state of the logical registers and a speculative register set containing speculative register state.

The interface unit 211 may generally include the circuitry for interfacing the processor 200 to other devices on the external interface. The external interface may include any type of interconnect (e.g. bus, packet, etc.). The external interface may be an on-chip interconnect, if the processor 200 is integrated with one or more other components (e.g. a system on a chip configuration). The external interface may be on off-chip interconnect to external circuitry, if the processor 200 is not integrated with other components. In various embodiments, the processor 200 may implement any instruction set architecture.

Branch Target Predictor

Branch target prediction may be employed in a processor to improve performance by allowing the processor to fetch and execute instructions without waiting for a conditional branch to evaluate, thereby keeping the pipeline of the processor full. In some embodiments, a prediction may be made as to the direction of the conditional branch while, in other embodiments, a prediction of the target of a branch may be performed. The prediction of the target of a branch is a difficult problem. For example, to predict the direction of a branch requires only a single bit of information and there are only two possible outcomes. To predict a target, however, requires more than a single bit of information resulting in many possible combinations.

There are various types of branches that a processor may encounter. A branch may be static (the branch has a single target) or dynamic (the branch may have multiple targets). Additionally, a branch may be direct or indirect. An indirect branch may specify the location of the address of the next instruction to be executed, while a direct branch may specify the address of the next instruction to be executed. Certain programming styles, such as, object-oriented programming, may employ numerous virtual function calls which may, in turn, lead to numerous indirect branches.

Figure 3:
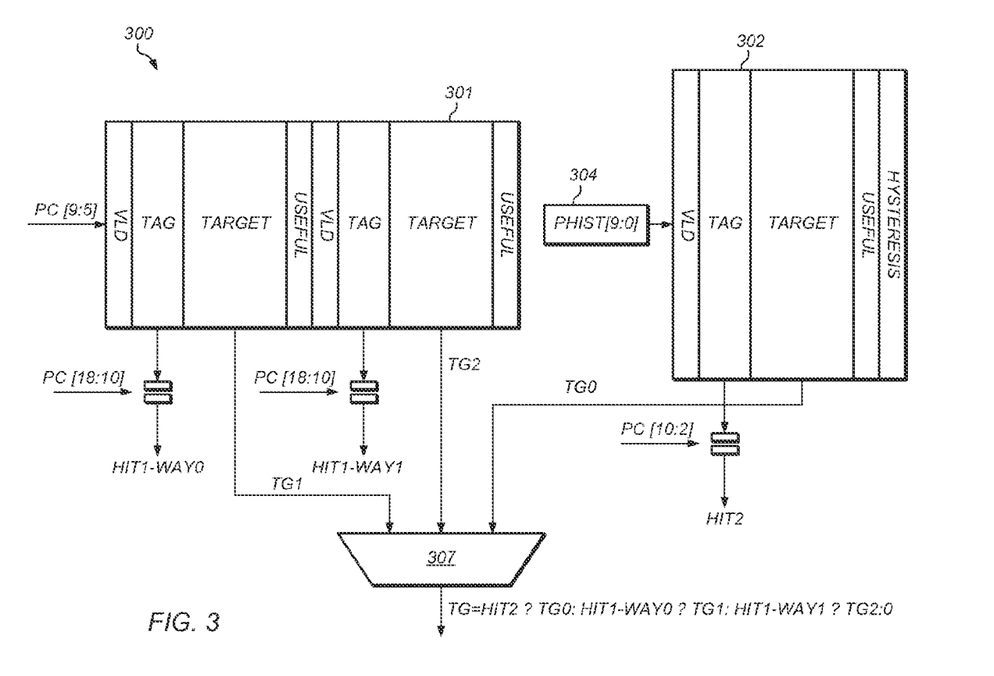
FIG. 3 illustrates an embodiment of a branch target predictor.

Turning to FIG. 3, an embodiment of a branch target predictor is illustrated. In the embodiment illustrated in FIG. 3, branch target predictor 300 includes branch target buffer 301, branch target buffer 302, logic circuit 308, and multiplex circuit 307.

In some embodiments, branch target buffer 301 may be implemented as a 32 entry, 2-way sets associative cache memory that employs an 8-bit tag. Each entry may include a tag value, a target value, a valid indicator, and a usefulness indicator. The usefulness indicator may, in some embodiments, contain information corresponding to the accuracy of the prediction (i.e., the predicted target address matched the actual target address), and may be implemented as a single bit of information. In other embodiments, the usefulness indicator may be implemented using a multi-bit word.

Branch target buffer 302 may be implemented as a direct-mapped 1024 entry cache memory. Each entry may include a tag value, a target value, a valid indicator, a usefulness indicator, and a hysteresis value. In various embodiments, branch target buffer 302 may be indexed with a combination of an 8-bit tag and a 9-bit path history, or any suitable number of bits of tag and path history data. Path history data may contain at least 1-bit of each of any suitable number of indirect branch targets. Each hysteresis value may contain information indicative of the number of mispredictions its corresponding entry has generated, and may be implemented with any suitable data word width.

Both branch target buffers 301 and 302 may use any suitable type of memory for storing their respective entries, such as, e.g., static random access memory (SRAM), or dynamic random access memory (DRAM), or any other suitable type of memory. One or both of branch target buffers 301 and 302 may be implemented as content addressable memory (CAMs) in various embodiments.

Logic circuit 308 may be configured combine path history 304 with a portion of program counter value 310 (denoted by "PC[10:2]") to form index 309 for accessing branch target buffer 302. In some embodiments, logic circuit 308 may implement the exclusive-OR logic function, or any suitable logic function for combining path history 304 with the portion of the program counter value 310. Although depicted as part of branch target predictor 300, logic circuit 308 may, in various embodiments, be included in other portions of a processor, such as, e.g., fetch control unit 201 of processor 200 as illustrated in FIG. 2.

It is noted that the embodiment illustrated in FIG. 3 is merely an example. In other embodiments, different numbers of branch target buffers, and different configurations of control circuits are possible and contemplated.

Figure 4:
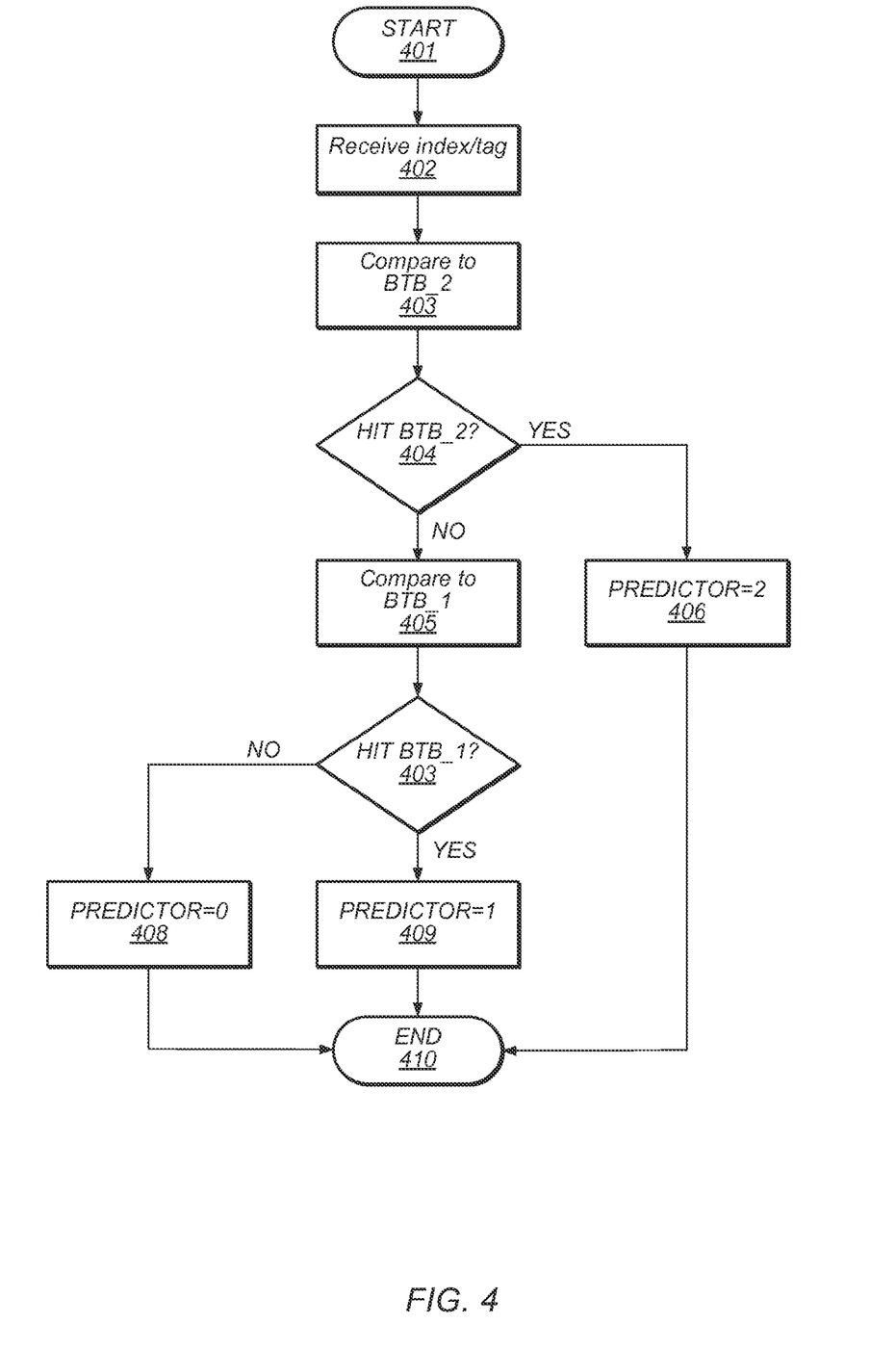
FIG. 4 illustrates an embodiment of a method to operate a branch target predictor.

Turning to FIG. 4, a flowchart depicting a method of operating a branch target predictor is illustrated. Referring collectively to FIG. 3 and FIG. 4, the method begins in block 401. An index value and a tag value are then received (block 402). The index value and tag value may be received from a fetch control unit, such as, e.g., fetch control unit 201 of processor 200 as illustrated in FIG. 2. In some embodiments, the index may include all or a portion of the current program counter value. The index may also be combined with a path history, such as path history 304 as illustrated in FIG. 3. The path history may include, in various embodiments, one or more bits of previous indirect branch targets.

The received index value may then be used to select one or more entries stored in branch target buffer 302 and the received tag value may then be compared to the tag values for the selected entries (block 403). The comparison may be made in parallel using a content-addressable memory (CAM) or other suitable comparison circuit. In other embodiments, the comparison may be performed in a sequential fashion. The method then depends on whether a match is found between the received tag value and the tag value of any of the selected entries in branch target buffer 302 (block 404). Although in the illustrated embodiment, the received index value is used to select entries for comparison to the received tag value, in various other embodiments, the received index value may not be used to select entries for comparison, and the received tag value may be compared to the tag value of all entries stored in branch target buffer 302.

When there is a match (commonly referred to as a "hit") between the received tag value and the tag value of one of the selected entries stored in branch target buffer 302, a predictor variable is loaded with a value of two (block 406). The predictor value may be stored in a register, register file, or any other suitable storage circuit coupled to branch target predictor 300. In some embodiments, as will be described in more detail below in reference to FIG. 5, the predictor variable may determine how indirect branches are allocated into branch target buffers 301 and 302.

When this is no match (commonly referred to as a "miss") between the received tag value and the tag value of any of the selected entries stored in branch target buffer 302, a comparison between the received tag and the tag values of entries stored in branch target buffer 301 is performed (block 405). The method then depends on the result of the comparison (block 407).

When there is a miss in branch target buffer 301, the predictor variable may be set to a value of zero (block 408). In some embodiments, this may correspond to a case when no prediction for an indirect branch corresponding to the received index and tag values may be possible. The method then concludes in block 410. When there is a hit in branch target buffer 301, the predictor variable may be set to a value of one (block 409). The method then concludes in block 410.

It is noted that in the method illustrated in FIG. 4, operations are depicted as being performed in a sequential fashion. In other embodiments, some or all of the operations depicted may be performed in parallel.

Following the operation of a branch target predictor to determine, if possible, a predict target address for an indirect branch, such as the method illustrated in FIG. 4, for example, updates to the entries stored in one or more branch target buffers included in the branch target predictor may be performed. An embodiment of method for updating the entries in branch target buffers is illustrated in FIG. 5.

Figure 5:
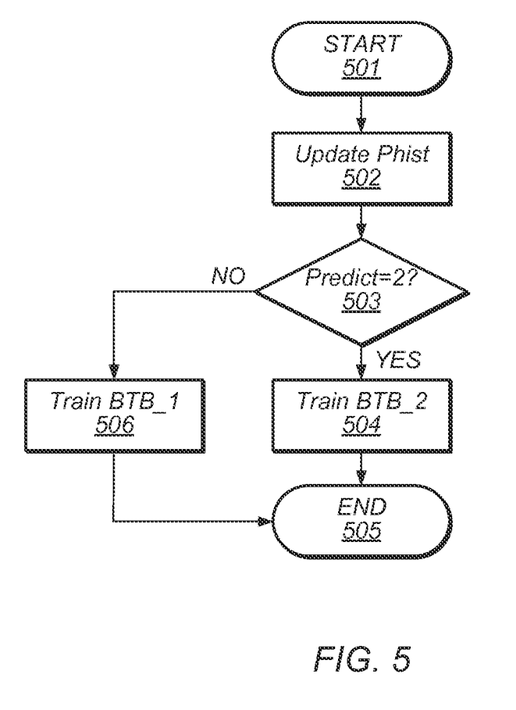
FIG. 5 illustrates a flowchart depicting an embodiment of another method for operating a branch target predictor.

Referring collectively to FIG. 3 and the flowchart illustrated in FIG. 5, the method begins in block 501. The path history is then updated (block 502). The method then depends on the value of a predictor variable, such as the predictor variable described in the method illustrated in FIG. 4, for example (block 503). When the value of the predictor variable is equal to two, the entries in branch target buffer 302 are updated (commonly referred to as "training" the branch target buffer). Once the training has been complete, the method concludes in block 505. When the value of the predictor variable is not equal to two, branch target buffer 301 is trained (block 506) as will be described in more detail below in reference to FIG. 6. The method then concludes in block 505.

It is noted that the method illustrated in FIG. 5 is merely an example. In other embodiments, different operations and different orders of operations are possible and contemplated.

Figure 6:
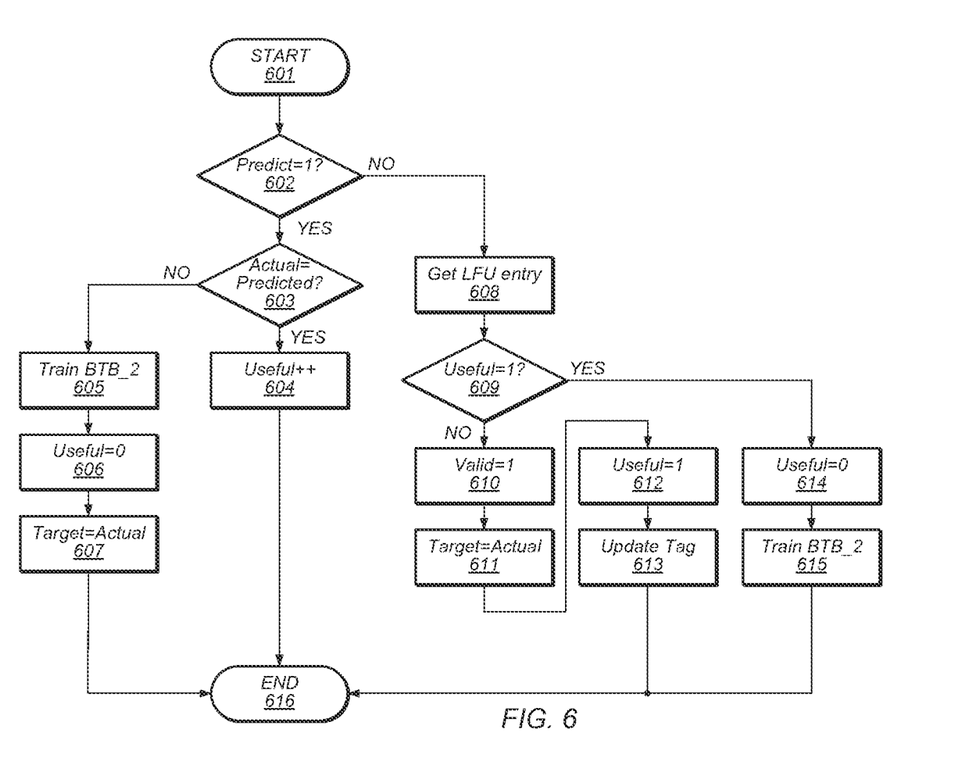
FIG. 6 illustrates an embodiment of a method for training a branch target buffer.

Turning to FIG. 6, a flowchart depicting an embodiment of method of training a branch target buffer is illustrated. The illustrated method may be used to train any suitable branch target buffer such as, branch target buffer 301 of branch target predictor 301 as illustrated in FIG. 3. In some embodiments, the illustrated method may correspond to operation 506 as depicted in the method illustrated in FIG. 5. Referring collectively to FIG. 3 and the flowchart illustrated in FIG. 6, the method begins in block 601. The method then depends on the state of the predictor variable (block 602).

When the value of the predictor variable is not equal to one (an indication in some embodiments of a received and tag values generated a miss in the branch target buffer), the least frequently used entry in the branch target buffer is selected (block 608). The operation then depends on the state of the usefulness indicator of the least frequently used entry (block 609). When, based on the usefulness indicator, the least frequently used entry is determined to have provided a correct prediction, its usefulness indicator is reset to zero (block 614). The index and tag values that generated the aforementioned miss in branch target buffer 301 is passed onto branch target buffer 302, which is then trained (block 615). The method then concludes in block 616.

When it is determined that the least frequently used entry is not useful, i.e., it has not previously resulted in a correct prediction, the entry is allocated to the branch that generated the miss. The valid value of the entry is set to one (block 610), and the target value of the entry is set to the actual target of branch being allocated (block 611). Next, the usefulness indicator is set to one (block 612), and the tag value for the entry is updated (block 613). The tag may contain the program counter value for branch being allocated. In other embodiments, a portion of the program counter value or a hash of the program counter value may be employed. The method then concludes (block 613).

When it is determined that the current branch generated a hit in branch target buffer 301, the method then depends on the accuracy of the prediction (block 603). The accuracy of the prediction may, in some embodiments, be determined by comparing the actual target address to the predicted target address or any other suitable comparison of actual and target values. When the prediction is determined to be accurate, the usefulness of the entry that generated the prediction is incremented (block 604). The method then concludes in block 616.

When the prediction is determined to not be accurate, the current branch is passed to branch target buffer 302, and the branch target buffer 302 is then, as will be described in more detail below in reference to FIG. 7, trained (block 605). The usefulness indicator of the entry that generated the misprediction is then set to zero (block 606). The target value for the entry is then set to the actual target address of the current branch (block 607). The method then concludes in block 616.

It is noted that the operations included in the method illustrated in FIG. 6 are depicted as being performed in a sequential fashion. In other embodiments, some or all of the operations may be performed in parallel.

Figure 7:
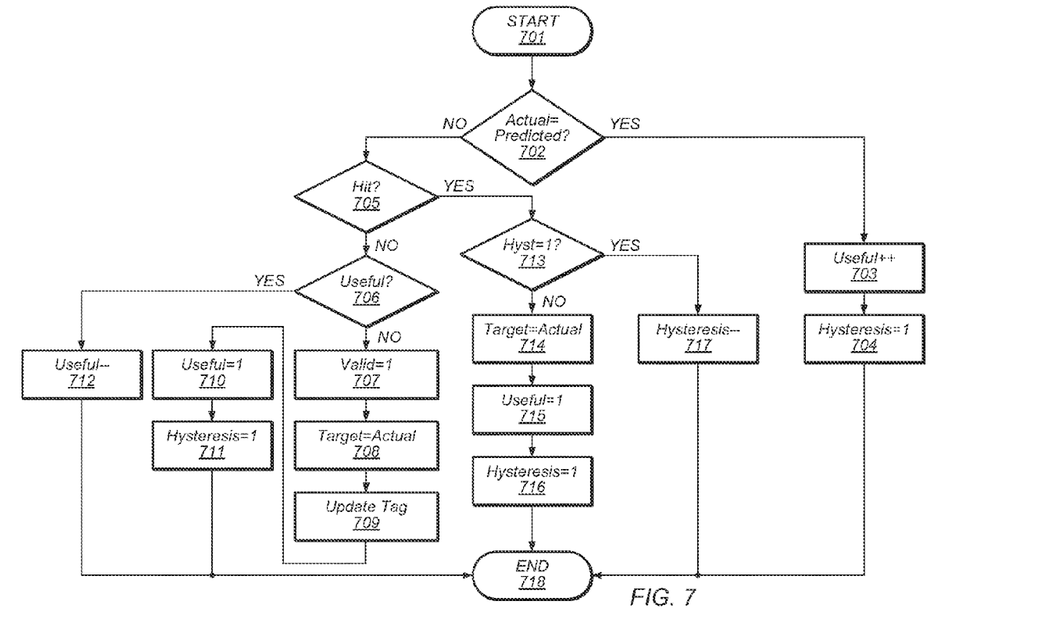
FIG. 7 illustrates an embodiment of another method for training a branch target buffer.

Turning to FIG. 7, an embodiment of a method for training a branch target buffer, such as, e.g., branch target buffer 302 of branch target predictor 300 as illustrated in FIG. 3, is illustrated. The method begins in block 701, and then is dependent on the accuracy of the prediction (block 702). The accuracy of the prediction may, in some embodiments, be determined by comparing the actual target address to the predicted target address or any other suitable comparison of actual and target values.

When it is determined that the prediction was accurate, the usefulness indicator of the entry that generated the prediction is incremented (block 703). The hysteresis value for the entry is then set to one (block 704). The operation then concludes in block 718.

When it is determined that the prediction was not accurate (i.e., a misprediction), the method then depends on if the current branch generated a hit in branch target buffer 302 (block 705). When the current branch did not generate a hit, the operation is dependent upon the usefulness indicator of the entry that generated the prediction (block 706). When the entry is determined to be useful, the value of the usefulness indicator is decremented (block 712). The method then concludes in block 718.

When the entry is determined to not be useful, the entry is allocated to the branch that generated the misprediction. The valid value of the entry is set to one (block 707), and the target value is set to the actual target address of the branch being allocated (block 708). The tag value is then updated (block 709). The tag may contain the program counter value for branch being allocated. In other embodiments, a portion of the program counter value or a hash of the program counter value may be employed. The usefulness indicator for the entry is then set to one (block 710), and the hysteresis value is also set to one (block 711). The method then concludes in block 718.

When the current branch generated a hit, the method then depends on the number of mispredictions the entry has generated (block 713). In some embodiments, the number of mispredictions may be determined based on the hysteresis value associated with the entry. When it is determined that the current misprediction is the first, the hysteresis value is decremented (block 717). The method then concludes in block 718.

When the entry has generated mispredictions more than once, the entry is updated. The target value is updated the actual target address (block 714), and the usefulness indicator of the entry is set to one (block 715). The hysteresis value is then set to one (block 716), and the method concludes in block 718.

It is noted that the method illustrated in FIG. 7 is merely an example. In other embodiments, different operations and different orders of operations are possible and contemplated.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a first memory configured to store a first plurality of entries, wherein each entry of the first plurality of entries includes a tag value, a target value, and a prediction accuracy value;
a second memory configured to store a second plurality of entries, wherein each entry of the second plurality of entries includes a tag value, a target value, a prediction accuracy value, and a hysteresis value that includes information indicative of a number of mispredictions of a corresponding entry of the second plurality of entries; and
a control module coupled to the memory and configured to receive an index value and a tag value corresponding to an indirect instruction branch, wherein the index value is used to read one or more entries of the first and second plurality of entries;
wherein the control module is further configured to, in response to a determination that the received tag value corresponding to the indirect instruction branch does not match the tag value of the first and second plurality of entries, select an entry in the first plurality of entries dependent upon the prediction accuracy values of the first plurality of entries, and allocate the selected entry to the instruction branch.

2. The apparatus of claim 1, wherein the control module is further configured to prevent allocation of the selected entry in response to a determination that the prediction accuracy value of the selected entry is indicative of a correct prediction from the entry.

3. The apparatus of claim 2, wherein the control module is further configured to reset the prediction accuracy value of the selected entry in response to the prevention of allocation.

4. The apparatus of claim 1, wherein the control module is further configured to, in response to a determination that the received tag value matches the tag value corresponding to the indirect instruction branch of one of the one of more first and second plurality of entries, set the prediction accuracy value to a value indicative of a correct prediction from the one of the one or more first and second plurality of entries.

5. The apparatus of claim 1, wherein the first memory comprises a cache memory.

6. A method, comprising:
storing, in a first memory, a first plurality of entries, wherein each entry of the first plurality of entries includes a tag value, a target value, and prediction accuracy value;
storing, in a second memory, a second plurality of entries, wherein each entry of the second plurality of entries includes a tag value, a target value, a prediction accuracy value, and a hysteresis value that includes information indicative of a number of mispredictions of corresponding entry of the second plurality of entries;
receiving an index value and a tag value corresponding to an indirect branch;
comparing, dependent upon the received index value, tag values in each or the first and second plurality of entries to the received tag value corresponding to the indirect branch;
selecting, in response to determining that the received tag value does not match the tag value of compared entries, an entry of the first plurality of entries dependent upon the prediction accuracy values of the plurality of entries;
allocating the selected entry to the indirect branch; and
setting the prediction accuracy value of the allocated entry to indicate an accurate prediction.

7. The method of claim 6, further comprising, preventing the allocation of the selected entry in response to determining that the prediction accuracy value of the selected entry is indicative of an accurate prediction.

8. The method of claim 7, further comprising, re-setting the prediction accuracy value of the selected entry in response to the prevention of the allocation.

9. The method of claim 6, further comprising, in response to determining that the received tag value corresponding to the indirect branch matches the tag value of an entry of the compared entries, setting the prediction accuracy value of the entry whose tag value matches the received tag value to a value indicative of an accurate prediction.

10. The method of claim 6, further comprising, updating the tag value and the target value of the selected entry of the first plurality of entries.

11. A system, comprising:
a processor; and
one or more memories;
wherein the processor includes a first branch target buffer, a second branch target buffer, and a control module coupled to the first and second branch target buffers, and configured to receive an indirect branch;
wherein the first branch target buffer is configured to store a first plurality of entries, wherein each entry includes a tag value, a target value, and a prediction accuracy value;
wherein the second branch target buffer is configured to store a second plurality of entries, wherein each entry of the second plurality of entries includes a tag value, a target value, a prediction accuracy value, and a hysteresis value that includes information indicative of a number of mispredictions of corresponding entry of the second plurality of entries;
wherein the control module is further configured to, in response to a determination that the received indirect branch does not match an entry in either of the first or second branch target buffers, select a least frequently used entry in the first branch target buffer, and allocate the received indirect branch to the least frequently used entry dependent upon the prediction accuracy value of the least frequently used entry.

12. The system of claim 11, wherein the control module is further configured to, in response to a determination that the received indirect branch matches an entry in the second branch target buffer, increase the prediction accuracy value of the matched entry.

13. The system of claim 11, wherein the control module is further configured to update the tag value and the target value of the least frequently used entry responsive to the allocation.

14. The system of claim 11, wherein the control module is further configured to decrease the prediction accuracy value of the least frequently used entry responsive to the allocation.

15. The system of claim 11, wherein the first branch target buffer comprises a cache memory.

16. A branch predictor, comprising:
- a first branch target buffer configured to store a first plurality of entries, wherein each entry of the first plurality of entries includes a tag value, a target value, and a prediction accuracy value;
- a second branch target buffer configured to store a second plurality of entries, where in each entry of the second plurality of entries includes a tag value, a target value, a prediction accuracy value, and a hysteresis value that includes information indicative of a number of mispredictions of corresponding entry of the second plurality of entries; and
- a control module coupled to the first branch target buffer and the second branch target buffer, and configured to receive an indirect branch;
- wherein the control module is configured to, in response to a determination that the received indirect branch does not match an entry in either the first plurality of entries and the second plurality of entries, select a least frequently used entry in the first branch target buffer, and allocate the indirect branch to the selected least frequently used entry dependent upon the accuracy of the selected least frequently used entry.

17. The branch predictor of claim 16, wherein the control module is further configured to update a path history.

18. The branch predictor of claim 17, wherein to determine that the received indirect branch does not match an entry in either the first plurality of entries or the second plurality of entries, the control module is further configured to combine the path history with the received indirect branch.

19. The branch predictor of claim 16, wherein the control module is further configured to, in response to a determination that the received indirect branch matches an entry in the second branch target buffer, train the second branch target buffer with the received indirect branch.

20. The branch predictor of claim 16, wherein the first branch target buffer comprises a 2-way set associative cache memory.

21. A method, comprising:
- storing, in a first table, a first plurality of entries, wherein each entry of the first plurality of entries includes a tag value, a target value, and a prediction accuracy value;
- storing, in a second table, a second plurality of entries, wherein each entry of the second plurality of entries includes a tag value, a target value, and a hysteresis value that includes information indicative of a number of mispredictions of corresponding entry of the second plurality of entries;
- receiving an index value and a tag value, wherein the index value and the tag value correspond to an indirect instruction branch;
- comparing, dependent upon the received index value, the received tag value corresponding to the indirect instruction branch to tag values of first plurality of entries and the second plurality of entries;
- selecting, in response to determining that the received tag value does not match the tag value of each compared entry in the first plurality of entries and the second plurality of entries, an entry in the first plurality of entries dependent upon the prediction accuracy values of the first plurality of entries;
- allocating the selected entry to the indirect instruction branch; and
- setting the prediction accuracy of the allocated selected entry in the first plurality to indicate an accurate prediction.

22. The method of claim 21, further comprising preventing the allocation of the selected entry to the indirect instruction branch, in response to determining that prediction accuracy value of the selected entry is indicative of an accurate prediction.

23. The method of claim 22, further comprising, in response to the prevention of the allocation, re-setting the prediction accuracy value of the selected entry.

24. The method of claim 21, further comprising, selecting, in response to a determining that the prediction accuracies of the plurality of first entries indicate accurate predictions, an entry in the second plurality of entries dependent upon the prediction accuracies of the second plurality of entries.

25. The method of claim 21, further comprising, setting, in response to a determining that the received tag value matches the tag value of an entry in the second plurality of entries, the prediction accuracy value of the matched entry in the second plurality of entries to indicate an accurate prediction.

* * * * *